Figure 1:
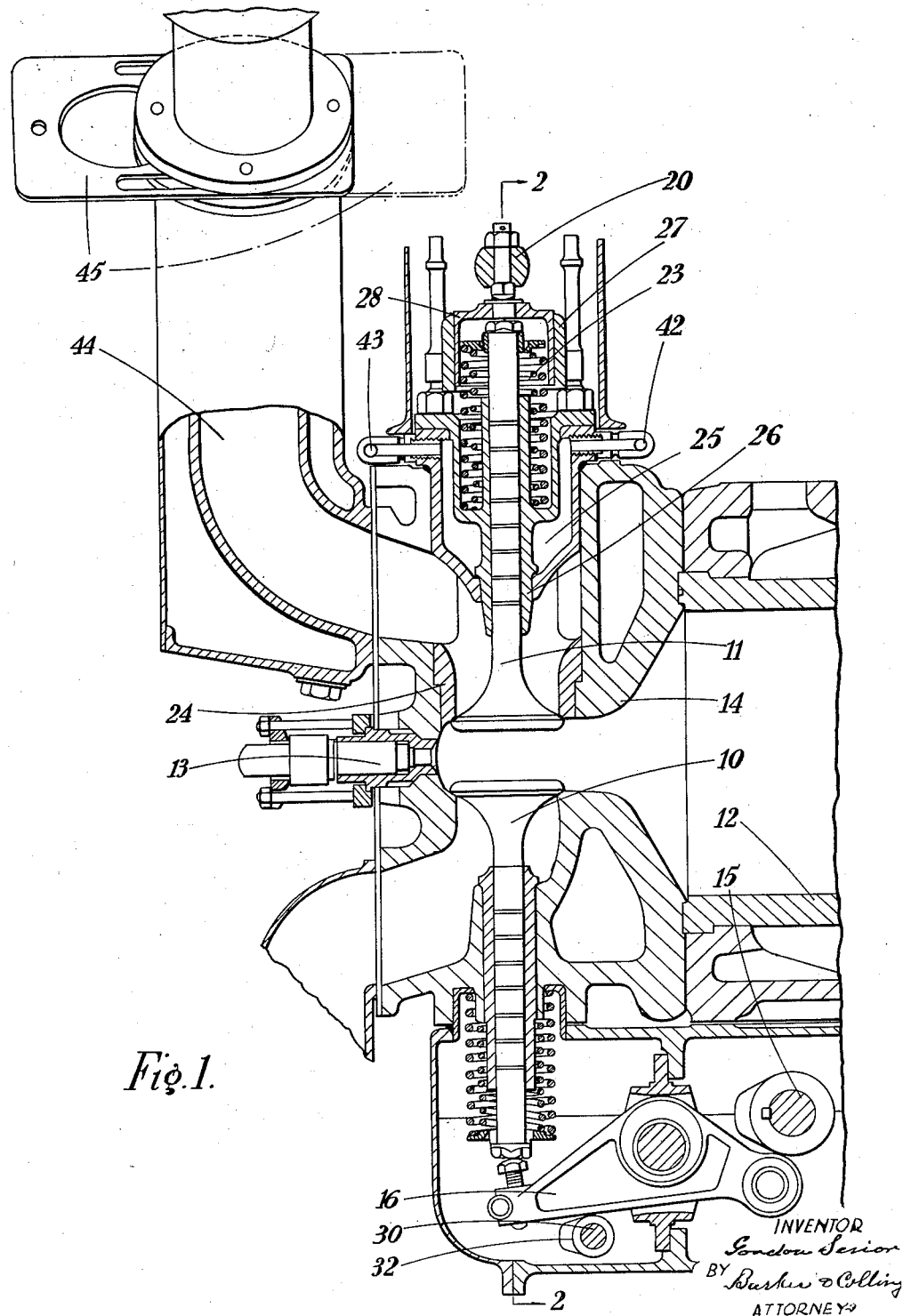

Patented Aug. 31, 1937

2,091,741

UNITED STATES PATENT OFFICE 2,091,741

MULTICYLINDER INTERNAL COMBUSTION ENGINE, PARTICULARLY DIESEL AND LIKE ENGINE

Gordon Senior, Quorn, England

Application September 4, 1936, Serial No. 99,474
In Great Britain February 22, 1935

4 Claims. (Cl. 123—52)

This invention is for improvements in multi-cylinder internal combustion engines (i. e. engines having two or more cylinders) and particularly relates to high compression engines such as Diesel and semi-Diesel engines. In all internal combustion engines, the exhaust valve and its seating are subjected to severe usage, such that it is sometimes advisable to recondition or renew one or other of these parts in one of the cylinders, before it is convenient or necessary to dismantle the entire engine for a complete overhaul. Similarly, it is sometimes desirable to remove the injector temporarily from a certain cylinder of a compression-ignition engine, perhaps because that injector has become choked. Often, as for example on board ship where compression-ignition oil engines are utilized to drive various auxiliaries, such as dynamos, refrigerating plant, and ventilators, or the lige, it is only convenient to bring such an engine to a standstill at widely spaced intervals, although the minor repairs or adjustments referred to above may become an urgent necessity in any one cylinder between said intervals. Hence, there is need for an arrangement whereby the exhaust valve or seating and/or the injector may be removed from one cylinder while the engine continues to run on the other cylinders. The same requirement, which it is the chief object of the present invention to fulfill, is also present in the case of engines that are used for propulsion, and in power stations.

This invention therefore provides a multi-cylinder internal combustion engine, particularly a high compression engine such as a Diesel or semi-Diesel engine, having means for rendering any selected cylinder inoperative, and means permitting of the removal from said selected cylinder of a valve and valve seating and/or the injector in the case of an injection engine, while the engine continues to run on the remaining cylinder or cylinders. As will readily be understood, in a high compression engine it is necessary materially to reduce the compression of the selected cylinder before attempting to remove the valve and valve seating, or the injector as the case may be, for even if the cylinder is not firing the air compressed therein will expand with explosive force and, hence, means are desirably incorporated for reducing the compression, preferably by keeping the inlet valve open or partially open. Therefore, the present invention may also be defined as the provision in a multi-cylinder compression-ignition engine having in each of a plurality of the power cylinders a removable injector and/or a removable exhaust valve-seating and valve, of means for holding open or partially open the inlet valve of any selected one of said cylinders while the engine continues to run on the remainder. Desirably there is provided, in combination with means for reducing the compression in the selected cylinder (e. g. the means, specified in the preceding sentence, for holding the inlet valve open or partially open), means for rendering inoperative the mechanism for actuating the exhaust valve of said cylinder preparatory to removing the valve and its seating. More specifically there may be an exhaust cam, a cam follower (e. g. constituted by or co-operating with a rocker), an operating connection extending from the follower to the valve, means for holding the follower clear of the cam, and means for so adjusting the said connection as to nullify the effect of this operation upon the valve (e. g. so as to prevent the valve lifting when the follower is moved clear of the cam or to permit the valve to return to its seat).

An important subsidiary feature of this invention, as applied to an engine wherein the exhaust passages from a plurality of cylinders communicate, resides in the provision of means, such as a baffle, for blocking the exhaust passage, of any selected cylinder between the exhaust valve of that cylinder and the junction of said passage with the other passages. Were the said passage not blocked the operation of removing the exhaust valve and its seating would be complicated by hot exhaust gas from the other cylinders blowing back along the passage.

Figure 2:
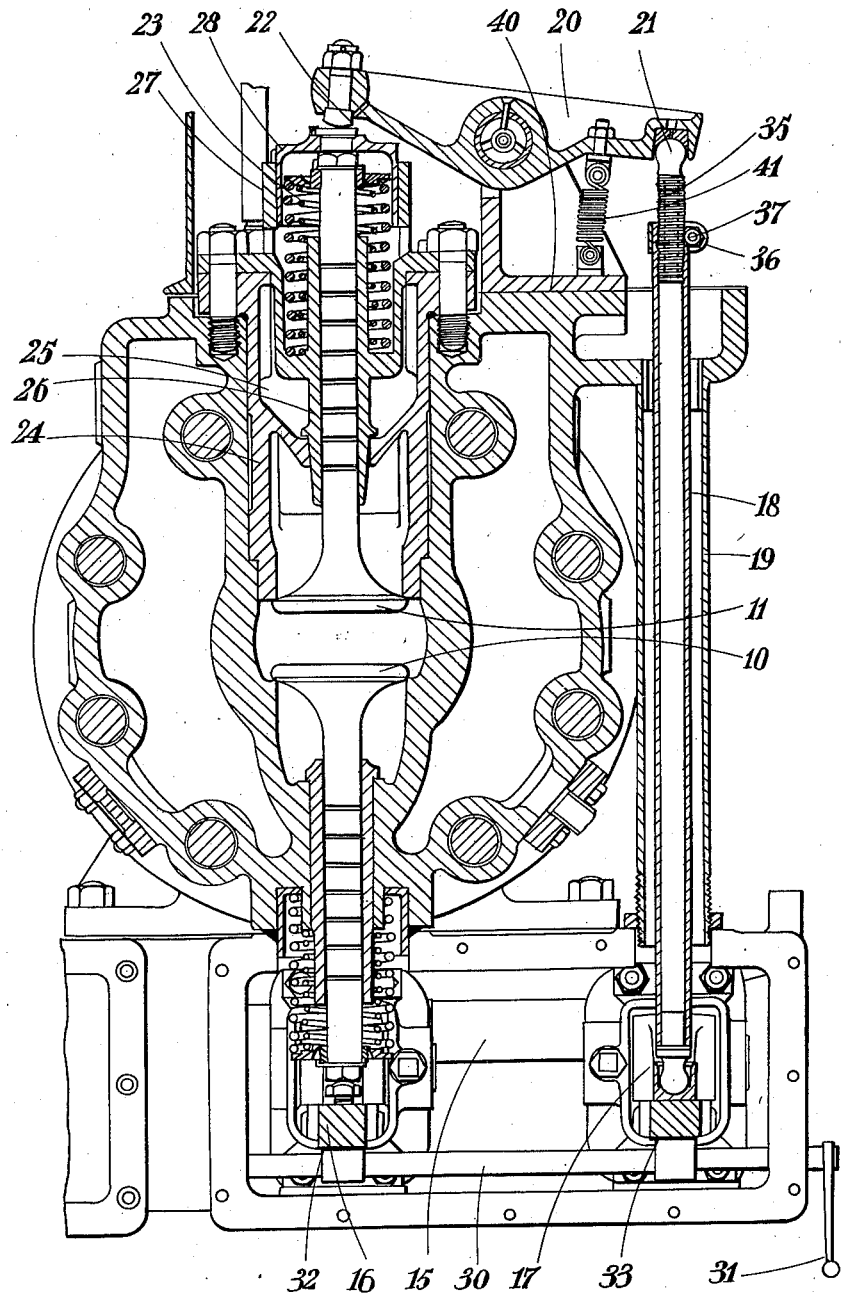

In order that the invention may be better understood its application to a Diesel engine having a plurality of horizontal cylinders, each equipped with a vertically disposed exhaust valve at the top of the cylinder head, and an air inlet valve in line therewith at the bottom of the head, will now be described in detail by way of example with reference to the accompanying drawings in which Figure 1 is a vertical cross-section of the head of one cylinder, showing the valves and the injector, while Figure 2 is a sectional elevation on the line 2—2 of Fig. 1, looking in the direction of the arrows.

Throughout this description like reference numerals indicate like parts.

In the accompanying drawings, only one cylinder is illustrated, for the valve gear of the other power cylinders in the horizontal bank of cylinders is identical therewith. In addition to the parts above mentioned, each cylinder also has an oil injector 13 located centrally in the cylinder head 14 midway between the two valves 10, 11, and the said valves are operated by a horizontal cam shaft 15 that extends along beneath all the cylinders. The inlet valve 10 of each cylinder 12 is operated directly from the said cam shaft 15 by means of a rocker 16 which is pivoted beneath the cylinder. The exhaust valve 11 is operated by mechanism which comprises a rocker 17 beneath the cylinder, a push rod 18 which extends in a tubular housing 19 vertically upwards past the cylinder, and a further rocker 20 pivoted at the top of the cylinder (its axis being at right-angles to that of the lower rocker), one end of said rocker being engaged by the spherical head 21 of the push rod 18 and the other being provided with a tappet screw 22 for operating the exhaust valve. This exhaust valve is bodily removable in an upward direction, together with its seating and spring 23, for the seating is formed in a cage 24 which is removably secured in a suitable vertical bore in the cylinder head.

The said cage also contains a water space 25 surrounding the guide 26 for the valve stem, which guide, in order to facilitate the construction of water space, is made as a separate part inserted in the cage. An upward cylindrical extension 27 of the said guide slidably receives a cup-like plunger 28 which is inverted over the upper end of the valve stem and is interposed between said stem and the operating tappet 22, so that side thrust (due to the arcuate motion of said tappet) is taken by the plunger and is not applied to the valve stem. The valve springs encircle the stem inside the cup-like plunger and the cylindrical housing in which the latter slides.

For each cylinder there is provided, adjacent to the main cam shaft 15, a small spindle 30 carrying cams, eccentrics, or the like 32, 33 arranged, when the said spindle is turned by means of a suitable operating handle 31, to engage the inlet valve rocker 16 and the lower rocker 17 for the exhaust valve and thereby to hold the inlet valve open so that the cylinder compression is entirely relieved and also to raise the lower rocker 17 of the exhaust valve clear of the operating cam on the main cam shaft 15, so that the exhaust valve operating gear is rendered inoperative. When this is done, the engine will, of course, continue to run on the other cylinders.

After the above operation has been performed and the oil injection has been rendered inoperative in any suitable manner, the injector 13 for the selected cylinder under discussion can safely be removed and replaced. If it is desired to remove the exhaust valve and its seating, however, further operations are necessary. Because the lower rocker 17 for the exhaust valve is held out of contact with its operating cam, the push rod 18 is raised and the exhaust valve held open. This will render it difficult to remove the said valve and its seating and, therefore, it is necessary first to permit the valve to close.

Most conveniently, this is effected by reducing the effective length of the push rod 18. Hence, the push rod is tubular, or at least has its upper end tubular, and is screw-threaded internally to receive a comparatively long screw 35 on which the ball-end 21 is formed. The said upper end of the push rod is split and an encircling collar 36 and a clamping screw 37 are provided for constricting the push rod to clamp the ball-ended screw in the operative position, in which position a substantial length of the screw projects from the end of said rod.

To shorten the effective length of the push rod the clamping screw 37 is slacked off and the ball-ended screw 35 screwed down into the interior of the push rod to an extent sufficient to permit the exhaust valve to close, or nearly to close. After this has been done, the exhaust valve rocker 20 can be removed. This rocker is conveniently pivoted upon a bracket 40 secured by screws or otherwise to the top of the cylinder head, there being a tension spring 41 extending between the said bracket and the push rod arm of the rocker 20 to relieve the valve spring 23 of the inertia load of the rocker and push rod, and the said bracket 40, rocker 20, and spring 41, may be removed as one unit.

Either before or after this stage has been reached, the circulation of cooling water to the water space 25 in the exhaust valve cage 24 is cut off, and the connecting pipe or pipes (such as 42, 43, in Fig. 1) disconnected. Furthermore, if the exhaust passage 44 leading from the valve under consideration communicates with the exhaust passage leading from the exhaust valve of another cylinder (which continues to fire), a baffle 45 is inserted in said passage between the exhaust valve and the junction of the passage with the other passage or passages, to prevent blow-back of the exhaust gases. By removing the securing nuts or the like, the exhaust valve cage 24, complete with the valve 11, valve guide 26, valve spring 23 and the cup-like plunger 28, may be removed as a unit and the necessary replacements or adjustments effected, after which the hereinbefore described operations are repeated in reverse sequence, to restore the cylinder to operation.

The term cylinder accessory as used herein refers to a part of an engine of the type described, which is associated with a particular cylinder and is necessary to the functioning of that cylinder for power purposes; and it includes such parts as the injector, when that is a part of the engine cylinder assembly, the exhaust valve, its seating, and the operating connections for working the valves, and their supports or mountings. The invention has for its object, as has been pointed out, to permit the removal for substitution or repair, as that may become necessary, of such cylinder accessories, or any of them, without necessitating the stopping of the engine or even the stopping of the movements of the piston within that cylinder of the engine, a cylinder accessory of which it may be necessary to remove.

I claim:—

1. In a multi-cylinder internal combustion engine having an exhaust passage common to a plurality of the cylinders, particularly a high compression engine such as a Diesel or semi-Diesel engine, the combination of means for rendering any selected cylinder inoperative or dead for power producing purposes without disturbing its driving connections, means for reducing the compression produced in said dead cylinder due to the movements of the piston therein obstructing means for cutting off or blocking any particular cylinder from the exhaust passage, and a cylinder accessory easily removable from the cylinder when the same has been rendered dead and the compression thereof reduced.

2. In a multi-cylinder high compression internal combustion engine, the combination of means for rendering any selected cylinder inoperative as a power delivering unit while the engine continues to run on the remainder of the cylinders, means for cutting off or blocking back pressure from the exhaust to the cylinder so rendered inoperative, a valve seating, easily removable from the cylinder when rendered inoperative and cut off from the exhaust, and means for rendering inoperative the mechanism that actuates the valve in such removable seating while the engine is running.

3. In a multi-cylinder compression-ignition engine, the combination, with the inlet and exhaust spring-seated valves for the cylinders, the exhaust valves being easily removable from their cylinders, and means for moving the valves in the usual operations of the engine, of means for rendering any selected cylinder inoperative or dead for power delivery purposes without disturbing its driving connections, including manual control means for holding the valves of the selected cylinder open and inoperative, a portion of the gear for the exhaust valve being adjustable to permit that valve to seat after adjustment to render the cylinder dead, thus relieving the valve from the stress of its spring.

4. A multi-cylinder compression ignition engine such as described in claim 3, wherein the portion of the exhaust valve gear that is connected with the exhaust valve is displaceable, after the exhaust valve is seated as set forth, to permit the easy removal of such valve.

GORDON SENIOR.